United States Patent
Needham et al.

(10) Patent No.: US 7,099,290 B2
(45) Date of Patent: Aug. 29, 2006

(54) METHOD AND APPARATUS FOR CDMA-DISPATCH SOFT HANDOFF

(75) Inventors: Michael L. Needham, Palatine, IL (US); Timothy J. Wilson, Rolling Meadows, IL (US); Leigh M. Chinitz, Wellesley, MA (US)

(73) Assignee: Motorola, Inc., Schaumburg, IL (US)

( * ) Notice: Subject to any disclaimer, the term of this patent is extended or adjusted under 35 U.S.C. 154(b) by 625 days.

(21) Appl. No.: 10/027,488

(22) Filed: Dec. 20, 2001

(65) Prior Publication Data

US 2003/0117976 A1    Jun. 26, 2003

(51) Int. Cl.
  *H04Q 7/00*    (2006.01)
(52) U.S. Cl. .................. 370/331; 455/442; 455/519
(58) Field of Classification Search ............... 370/331, 370/332, 334, 333; 455/436, 437, 442, 443, 455/444
  See application file for complete search history.

(56) References Cited

U.S. PATENT DOCUMENTS

| | | | |
|---|---|---|---|
| 5,056,109 A | 10/1991 | Gilhousen et al. |
| 5,216,692 A | 6/1993 | Ling |
| 5,257,183 A | 10/1993 | Tam |
| 5,265,119 A | 11/1993 | Gilhousen |
| 5,267,262 A | 11/1993 | Wheatley, III |
| 5,323,452 A | 6/1994 | Dickman et al. |
| 5,383,219 A | 1/1995 | Wheatley, III et al. |
| 5,485,486 A | 1/1996 | Gilhousen et al. |
| 5,548,808 A | 8/1996 | Bruckert et al. |
| 5,590,177 A | 12/1996 | Vilmur et al. |
| 5,613,209 A | 3/1997 | Peterson et al. |
| 5,621,723 A | 4/1997 | Walton, Jr. et al. |
| 5,691,979 A | 11/1997 | Cadd et al. |
| 5,711,011 A | 1/1998 | Urs et al. |
| 5,797,097 A | 8/1998 | Roach, Jr. et al. |
| 5,852,781 A | 12/1998 | Ahvenainen |
| 5,878,038 A | 3/1999 | Willey |
| 5,881,058 A | 3/1999 | Chen |
| 5,881,368 A | 3/1999 | Grob et al. |
| 5,887,252 A | 3/1999 | Noneman |
| 5,914,958 A | 6/1999 | Chinitz et al. |
| 5,920,549 A | 7/1999 | Bruckert et al. |
| 5,956,641 A | 9/1999 | Bruckert et al. |
| 5,960,356 A | 9/1999 | Alperovich et al. |
| 5,987,012 A | 11/1999 | Bruckert et al. |
| 6,005,848 A | 12/1999 | Grube et al. |
| 6,058,308 A | 5/2000 | Kallin et al. |
| 6,115,388 A | 9/2000 | Chinitz et al. |
| 6,119,007 A | 9/2000 | Chater-Lea |
| 6,161,016 A * | 12/2000 | Yarwood .................... 455/445 |
| 6,167,269 A | 12/2000 | Kondo |

(Continued)

FOREIGN PATENT DOCUMENTS

EP    0 828 355 A2    3/1998

(Continued)

*Primary Examiner*—Doris H. To
*Assistant Examiner*—Thien D. Tran
(74) *Attorney, Agent, or Firm*—Jeffrey K. Jacobs

(57) ABSTRACT

To address the need for an apparatus and method for CDMA-dispatch soft handoff, the present invention provides soft handoff to mobile stations (MSs) (120–123) in a dispatch call by sharing soft handoff information with all the MSs in the call at a base site (111). When a first MS (e.g., 120) needs to soft handoff, the identity of a soft handoff channel (135) at an adjacent base site (112) is shared with all the MSs. Thus, subsequent MSs (e.g. 122) that need to soft handoff to that adjacent base site may do so without requesting a soft handoff.

22 Claims, 2 Drawing Sheets

U.S. PATENT DOCUMENTS

| | | |
|---|---|---|
| 6,169,906 B1 | 1/2001 | Bruckert |
| 6,178,166 B1 | 1/2001 | Wilson et al. |
| 6,181,682 B1 * | 1/2001 | Abbadessa et al. ......... 370/328 |
| 6,181,685 B1 | 1/2001 | Chinitz et al. |
| 6,188,767 B1 | 2/2001 | Needham et al. |
| 6,233,461 B1 | 5/2001 | Chinitz et al. |
| 6,333,921 B1 | 12/2001 | Grube et al. |
| 6,507,567 B1 * | 1/2003 | Willars ....................... 370/321 |
| 6,792,276 B1 * | 9/2004 | Butovitsch et al. ......... 455/453 |
| 2002/0004371 A1 * | 1/2002 | Montgolfier ................. 455/70 |

FOREIGN PATENT DOCUMENTS

WO     WO 99/14972    *   3/1999

* cited by examiner

METHOD AND APPARATUS FOR CDMA-DISPATCH SOFT HANDOFF

CROSS-REFERENCE TO RELATED APPLICATION

This application is related to the following co-pending applications all filed on even date herewith, all assigned to the assignee of the present application, and all hereby incorporated by reference into the present application: "METHOD AND APPARATUS FOR MOBILE-INITIATED, CDMA-DISPATCH SOFT HANDOFF," "METHOD AND APPARATUS FOR BASE-INITIATED, CDMA-DISPATCH SOFT HANDOFF," "METHOD AND APPARATUS FOR QUICKLY ESTABLISHING A CDMA DISPATCH CALL," and "BASE SITE AND METHOD FOR QUICKLY ESTABLISHING A CDMA DISPATCH CALL."

FIELD OF THE INVENTION

The present invention relates generally to the field of wireless communications, and more particularly, to code division multiple access (CDMA) communication systems and dispatch group call communication systems.

BACKGROUND OF THE INVENTION

A typical dispatch two-way radio communication system comprises communication units, communication resources, communication sites, and a communication resource allocator. Each of the sites has a substantially distinct coverage area and is geographically located throughout the system. Each site also has a number of communication resources assigned to it, where at least one of the communication resources is used as a control channel, while a number of the remaining communication resources are used as voice channels. Such systems are known to use both frequency division multiplex access (FDMA) and time division multiple access (TDMA) methods to rebroadcast transmissions.

The communication units are typically arranged into communication groups (talkgroups) and may be located anywhere within the system (in any site). When a communication unit of a talkgroup requests a group call, it transmits, via a control channel of the site in which it is located, an inbound signaling message to the communication resource allocator. (A group call typically allows all members of the same talkgroup that are located within the system to communicate with each other.) The inbound signaling message generally comprises the requesting communication unit's individual identification number, the requesting communication unit's talkgroup, and a request for a group call. Upon receiving the inbound signaling message, the communication resource allocator will allocate a voice channel in each site to the requesting communication unit's talkgroup.

Thus, in FDMA and TDMA dispatch systems a forward link is established (one in each site where communication units are present) and monitored by all units involved in the group call in that site, and a single reverse link which is used by the group member who is currently transmitting to the other members. Non-transmitting talkgroup members are typically in a listen only mode (i.e., not able to transmit when another member is talking) and thus are not allocated a dedicated reverse link. In a TDMA system, for example, time slots are allocated to different users. A talkgroup member transmitting on an assigned reverse link, is allowed to use full power transmission to support short bursts of signals in allocated time slots. Despite the discontinuous or discrete nature of this approach, the listener receives what appears a continuous service.

In the last decade, in response to an ever-accelerating worldwide demand for mobile and personal portable communications, spread spectrum digital technology, of which one type is known as CDMA, has achieved much higher bandwidth efficiency for a given wireless spectrum allocation, and hence has proved to be an excellent alternative for serving large populations of multiple access users, than analog or other digital technologies. CDMA relies on processing power to extract a coded signal embedded across a broad frequency spectrum. The only way to extract the wanted signal from among many other overlaid unwanted signals is to have the right code. The use of coding allows more channels to be derived by the overlaying of carriers one over another and greatly enhances performance in terms of derived channels per hertz of bandwidth.

CDMA is well suited for cellular communications, but has never been employed in a conventional dispatch system. Unlike conventional dispatch systems, CDMA systems require soft handoff at cell (site) boundaries. During a soft handoff, a communication unit, or mobile station (MS), receives the call transmission from multiple cells simultaneously until it completes the soft handoff. Employing CDMA in a conventional dispatch system requires a solution to the problem of providing soft handoff for multiple MSs that are participating in the dispatch call. Therefore, a need exists for an apparatus and method for CDMA-dispatch soft handoff.

DESCRIPTION OF A PREFERRED EMBODIMENT

To address the need for an apparatus and method for CDMA-dispatch soft handoff, the present invention provides soft handoff to mobile stations (MSs) in a dispatch call by sharing soft handoff information with all the MSs in the call at a base site. When a first MS needs to soft handoff, the identity of a soft handoff channel at an adjacent base site is shared with all the MSs. Thus, subsequent MSs that need to soft handoff to that adjacent base site may do so without requesting a soft handoff.

Figure 1:
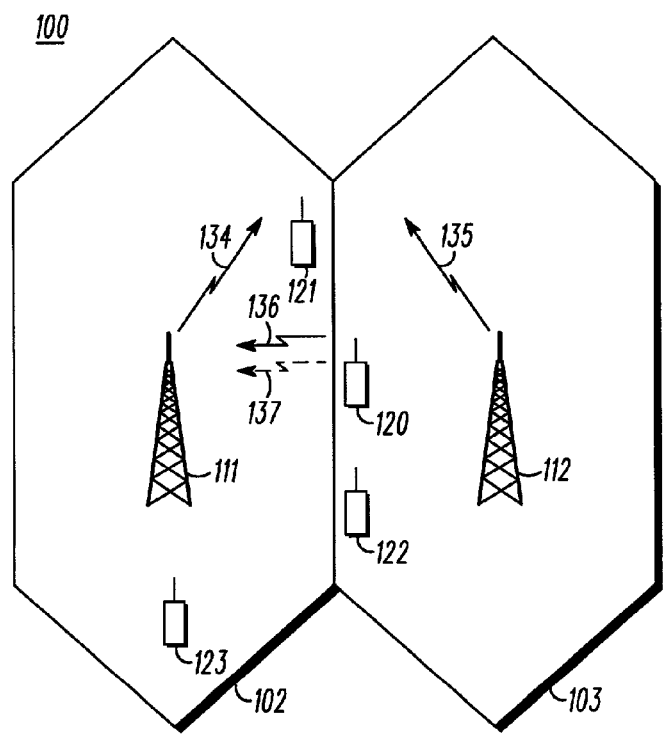
FIG. 1 is a block diagram depiction of a communication system in accordance with a preferred embodiment of the present invention.

The present invention can be more fully understood with reference to FIGS. 1–4, wherein like numerals designate like components. FIG. 1 is a block diagram depiction of communication system 100 in accordance with a preferred embodiment of the present invention. The wireless communication system 100 is a suitably modified CDMA system, such as a Wideband Spread Spectrum Digital Cellular System in accordance with, for example, the Telecommunications Industry Association/Electronic Industries Association Interim Standard 95 (EIA/TIA IS-95) as known in the art. System 100 comprises a plurality of communication units 120–123 that are each members of the same talkgroup. In the preferred embodiment, each of the communication units 120–123 is physically capable of duplex communications, although during typical group communications, only a single communication unit is transmitting at a time.

The fixed infrastructure comprises those elements normally required to support communications within wireless system 100 and, in the preferred embodiment, conforms to a typical CDMA architecture. In particular, the wireless CDMA communication infrastructure comprises well-known components such as base sites 111 and 112 and their respective service coverage areas 102 and 103. In practice, the base sites 111 and 112 typically communicate with one or more base site controllers, a switch, and additional well-known infrastructure equipment not shown. To illustrate the present invention simply and concisely, the communication infrastructure has been limited to that shown in FIG. 1.

Figure 2:
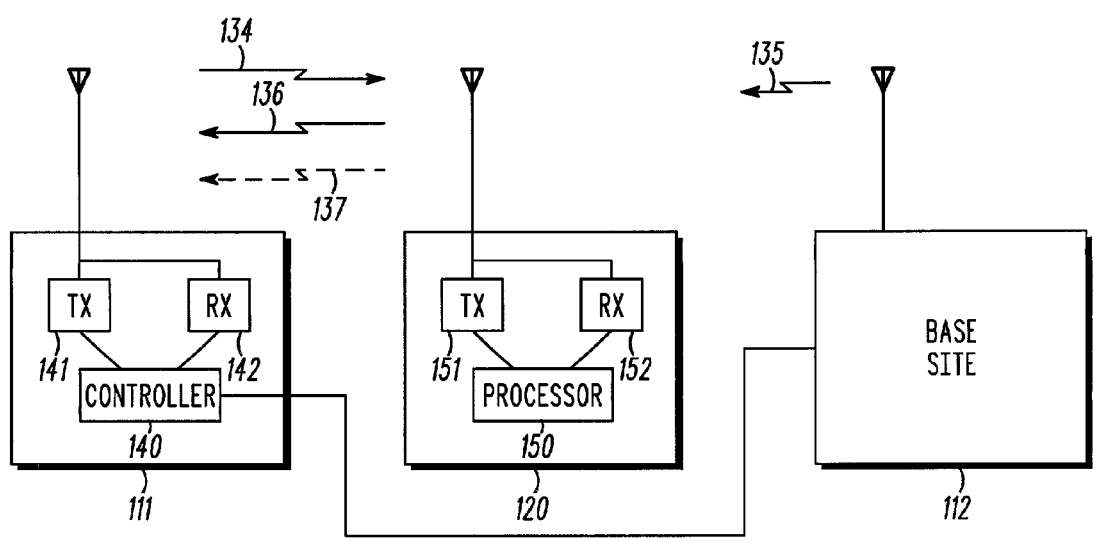
FIG. 2 is a block diagram depiction of base sites and a mobile station (MS) from the communication system of FIG. 1 in accordance with a preferred embodiment of the present invention.

FIG. 2 is a block diagram depiction of base sites 111 and 112 and mobile station (MS) 120 in accordance with a preferred embodiment of the present invention. (The widely-used, term-of-art, "mobile station," is used interchangeably with "communication unit" throughout this description.) Base site 111 comprises transmitter 141, receiver 142, and controller 140. Base sites in general and base site transmitters, receivers, and controllers in particular are well known in the art. Controller 140 preferably comprises one or more memory devices and processing devices such as a microprocessor and a computer memory. In the preferred embodiment, under the control of software/firmware algorithms stored in the memory devices of base site 111, base site 111 performs those tasks required for well-known base site operation and, additionally, the method described relative to FIG. 3.

Each of the communication units 120–123 comprises a common set of elements. In particular, processor 150, which typically comprises one or more processing devices (e.g., microprocessors, digital signal processors, etc.) and memory devices, is coupled to transmitter 151 and receiver 152. Each of these elements is well known in the art. In the preferred embodiment, under the control of software/firmware algorithms stored in the memory devices of MS 120, MS 120 performs those tasks required for well-known MS operation and, additionally, the method described relative to FIG. 4.

CDMA communication channels 134–137 are effectively provided through the use of codes using well-known techniques, e.g., through a combination of orthogonal Walsh codes and pseudorandom noise (PN) sequences. In the preferred embodiment, channels 134–135 comprise full-rate outbound traffic channels transmitted by base sites 111–112, respectively. Preferably, channel 136 is an inbound access channel on which any mobile station (MS) in the system may signal base site 111. Lastly, channel 137 is a low-rate inbound link used by an individual MS to communicate forward power control information, soft handoff information, and/or reverse power information. The use of this link is described at length in U.S. Pat. No. 5,914,958, entitled "FAST CALL SETUP IN A CDMA DISPATCH SYSTEM," and U.S. Pat. No. 6,115,388, entitled "ESTABLISHMENT OF MULTIPLE LOW-RATE INBOUND SIGNALING LINKS IN CDMA DISPATCH SYSTEM," both of which are hereby incorporated by reference.

Operation of a preferred communication system 100 occurs substantially as follows. When a dispatch call is initiated, full-rate CDMA outbound traffic channel 134 is established by base site 111 and used to begin transmitting the dispatch call to MSs 120–123. Preferably, after beginning to receive the call via channel 134, MS 120 transmits a request to base site 111 via access channel 136 to establish a low-rate inbound link with base site 111. Inbound link 137 is thus established. Like MS 120, MSs 121–123 would also establish their own low-rate inbound links with base site 111. All these low-rate inbound links are established in accord with the description in U.S. Pat. No. 5,914,958 or alternatively with the description in U.S. Pat. No. 6,115,388, both referred to above.

Sometime during the dispatch call, base site 111 determines that MS 120 should begin a soft handoff with base site 112. This determination can take at least two different forms depending on whether system 100 uses mobile-initiated soft handoff or base initiated soft handoff. In the mobile-initiated case, MS 120 uses inbound link 137 to request a soft handoff to base site 112. In the base-initiated case, base sites 111 and 112 determine from MS 120's signaling that MS 120 should begin a soft handoff with base site 112. Related applications filed on even date herewith and entitled "METHOD AND APPARATUS FOR MOBILE-INITIATED, CDMA-DISPATCH SOFT HANDOFF" and "METHOD AND APPARATUS FOR BASE-INITIATED, CDMA-DISPATCH SOFT HANDOFF" describe these activities in greater detail.

To support the soft handoff, base site 112 establishes full-rate CDMA outbound traffic channel 135 and begins transmitting the dispatch call in progress. To notify MS 120 of channel 135's availability for soft handoff, base site 111 preferably uses in-band signaling on channel 134 to indicate the identity of channel 135 and base site 112. In addition, base site 111 may also indicate the identity of MS 120 as a means to address the signaling to MS 120.

Although MS 120 has been determined to need a soft handoff, other MSs also part of the dispatch call, such as MS 121 and MS 122, may be close to handing off themselves. Moreover, because this is a dispatch call, there may be many more MSs involved in the call that also will need soft handoffs. For example, many callers might be on a train traveling towards base site 112 and require soft handoffs at virtually the same time. If they all attempt to request soft handoffs during the same period of time, system 100 may be overloaded potentially resulting in dropped calls. It is also possible that due to limited system resources not all MSs are able to obtain low-rate inbound links with base site 111. Without such links, these units may not be able to request a soft handoff at all.

To address these problems and to generally increase soft handoff efficiency, the present invention proposes that base site 111 signal MSs 120–123 (i.e., all MSs receiving the dispatch call via channel 134) indicating the identity and availability of channel 135 at base site 112 for soft handoff. Thus, MSs 120–123 all receive the notification that channel 135 at base site 112 can be used for soft handoff. In addition to MS 120, then, the other MSs, as needed, can begin a soft handoff by simultaneously receiving the dispatch call via the channels 134 and 135. Some of the MSs in the dispatch call are thus enabled to begin a soft handoff without the need to signal base site 111 or the need to have an inbound link with base site 111 established. In fact those MSs that begin a soft handoff with base site 112, may then request an inbound link with base site 112 whether or not they were able to obtain inbound links with base site 111.

In an alternative embodiment, rather than conveying the identity and availability of channel 135 at base site 112 via in-band signaling on channel 134, base site 111 could use a paging channel to convey the information. Specifically, base site 111 could transmit a broadcast page that conveys the identity and availability of channel 135 at base site 112. This broadcast page could also include a talkgroup ID to direct the page to the talkgroup involved in the dispatch call. All the MSs in the dispatch call who are simultaneously scanning the paging channel could thus receive the soft handoff information.

Figure 3:
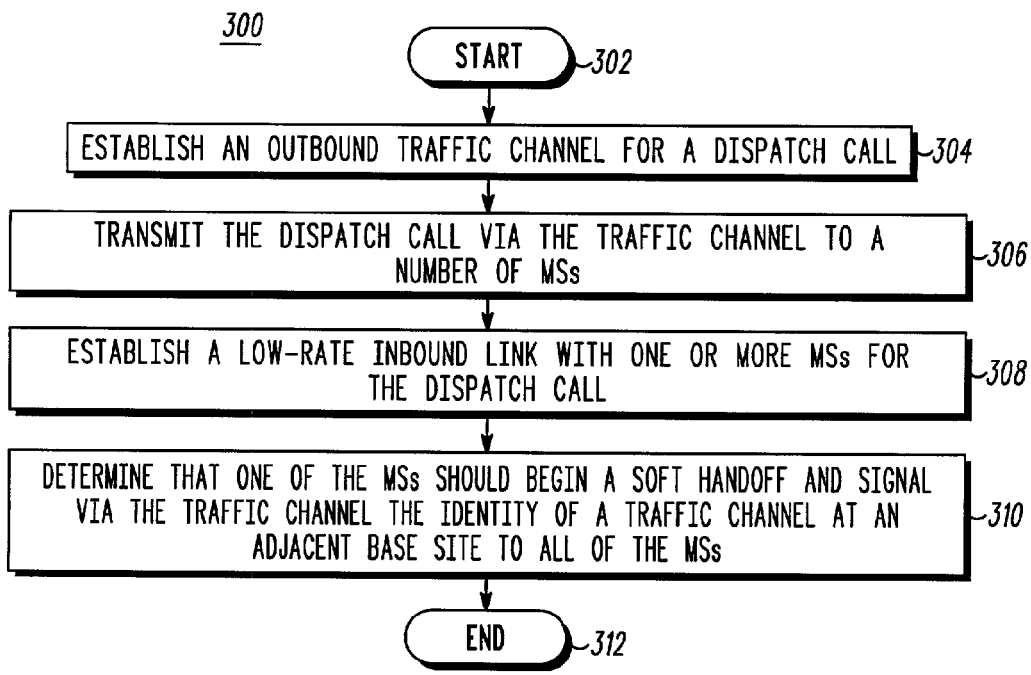
FIG. 3 is a logic flow diagram of steps executed by a base site in accordance with a preferred embodiment of the present invention.

FIG. 3 is a logic flow diagram of steps executed by a base site in accordance with a preferred embodiment of the present invention. Logic flow 300 begins (302) as a dispatch call is being set up by the base site. The base site preferably establishes (304) a full-rate outbound traffic channel on which to transmit (306) the dispatch call to a number of MSs in the base site's coverage area. The base site also establishes (308) a low-rate inbound link for the dispatch call with each MS that requests a link and for which channel resources permit. Upon determining (310) that one of the MSs should begin a soft handoff, the base site conveys the identity of a traffic channel at an adjacent site that can be used for a soft handoff to all of the MSs in the group call. Thus, the MSs are able to soft handoff as needed to a particular adjacent site after one of the MSs is determined to need a soft handoff to that adjacent site.

Figure 4:
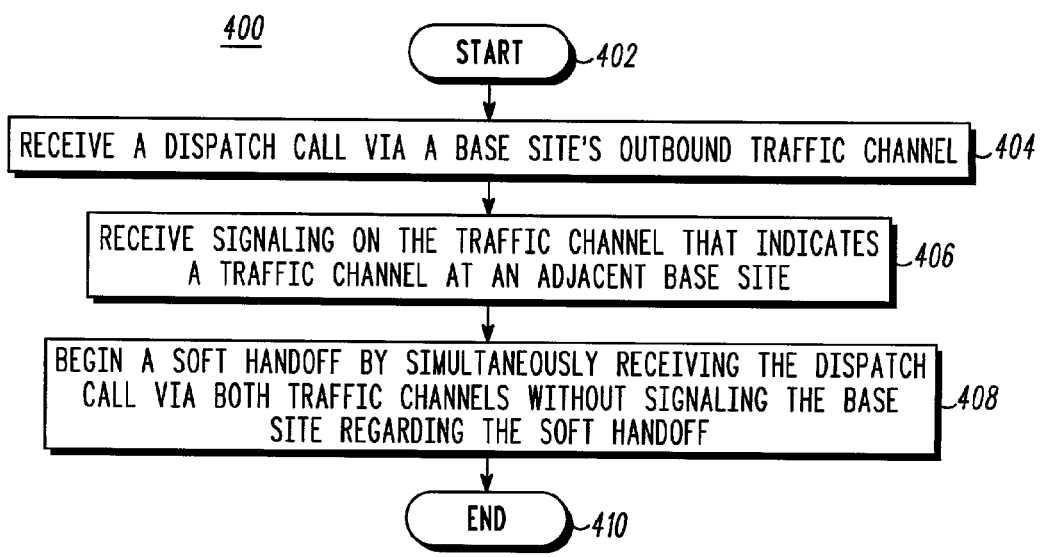
FIG. 4 is a logic flow diagram of steps executed by a mobile station in accordance with a preferred embodiment of the present invention.

FIG. 4 is a logic flow diagram of steps executed by a mobile station in accordance with a preferred embodiment of the present invention. Logic flow 400 begins (402) when the MS begins to receive (404) a dispatch call via an outbound link from a base site. Without signaling the base site regarding the need for a soft handoff, the MS receives (406) an indication of the identity of an outbound link from an adjacent base site on which the dispatch call can be received. When the MS needs to soft handoff to the adjacent site, the MS begins (408) a soft handoff by simultaneously receiving the dispatch call via both outbound links. Thus, logic flow 400 ends (410).

While the present invention has been particularly shown and described with reference to particular embodiments thereof, it will be understood by those skilled in the art that various changes in form and details may be made therein without departing from the spirit and scope of the present invention.

What is claimed is:

1. A method for a base site to facilitate CDMA-dispatch soft handoff comprising the steps of:
   establishing a first outbound link for a dispatch call;
   transmitting the dispatch call via the first outbound link to a plurality of mobile stations (MSs);
   determining a first MS of the plurality of MSs should begin a soft handoff via a second outbound link with an adjacent base site; and
   subsequent to the step of determining, indicating to at least one of the plurality of MSs in addition to the first MS the identity of the second outbound link and the identity of the adjacent base site.

2. The method of claim 1 further comprising the step of establishing an inbound link with the first MS for the dispatch call.

3. The method of claim 2 wherein the step of determining comprises the step of receiving a request to handoff from the first MS via the inbound link.

4. The method of claim 2 wherein the inbound link comprises a low-rate inbound link used to communicate at least one of forward power control information, soft hand-aft information, and reverse power information.

5. The method of claim 1 wherein the first outbound link and the second outbound link each comprises a full-rate CDMA outbound traffic channel.

6. The method of claim 1 wherein the step of indicating comprises the step of signaling in-band on the first outbound link the identity of the second outbound link and the identity of the adjacent base site.

7. The method of claim 1 wherein the step of indicating comprises the step of signaling via a paging channel the identity of the second outbound link and the identity of the adjacent base site.

8. The method of claim 7 wherein the step of signaling via a paging channel comprises the step of transmitting a broadcast page to convey the identity of the second outbound link and the identity of the adjacent base site.

9. The method of claim 1 further comprising the step of indicating the identity of the first MS with the identity of the second outbound link and the identity of the adjacent base site.

10. A method for a mobile station (MS) to perform a CDMA-dispatch soft handoff comprising the steps of:
    receiving a dispatch call via a first outbound link with a base site;
    receiving an indication of the identity of a second outbound link with an adjacent base site on which the dispatch call can be received and the identity of the adjacent base site; and
    beginning a soft handoff by simultaneously receiving the dispatch call via the first outbound link and the second outbound link without signaling the base site regarding the soft handoff.

11. The method of claim 10 wherein the MS does not have an inbound link to the first base site established for the dispatch call when beginning the soft handoff.

12. The method of claim 10 wherein the step of receiving the indication comprises the step of receiving in-band signaling on the first outbound link that conveys the identity of the second outbound link and the adjacent base site.

13. The method of claim 10 wherein the step of receiving the indication comprises the step of receiving via a paging channel the identity of the second outbound link and the adjacent base site.

14. The method of claim 13 wherein the step of receiving the indication comprises the step of receiving a broadcast page that conveys the identity of the second outbound link and the adjacent base site.

15. The method of claim 10 further comprising the step of transmitting a request to establish an inbound link with the adjacent base site for the dispatch call.

16. A base site comprising:
    a transmitter; and
    a controller, coupled to the transmitter, for establishing a first outbound link for a dispatch call, for instructing the transmitter to transmit the dispatch call via the first outbound link to a plurality of mobile stations (MSs), adapted to determining a first MS of the plurality of MSs should begin a soft handoff via a second outbound link with an adjacent base site, and adapted to instruct the transmitter to transmit a signal, subsequent to determining, that indicates to at least one of the plurality of MSs in addition to the first MS the identity of the second outbound link and the identity of the adjacent base site.

17. The base site of claim 16 wherein the controller is further for establishing an inbound link with the first MS for the dispatch call and wherein the base site further comprises a receiver for receiving a request to handoff from the first MS via the inbound link.

18. The base site of claim 17 wherein the inbound link comprises a low-rate inbound link used to communicate at least one of forward power control information, soft handoff information, and reverse power information.

19. The base site of claim 16 wherein the first outbound link and the second outbound link each comprises a full-rate CDMA outbound traffic channel.

20. A mobile station (MS) comprising:
   a receiver; and
   a processor, coupled to the receiver, for instructing the receiver to receive a dispatch call via a first outbound link with a base site, for instructing the receiver to receive an indication of the identity of a second outbound link with an adjacent base site on which the dispatch call can be received and the identity of the adjacent base site, and for beginning a soft handoff without signaling the base site regarding the soft handoff by instructing the receiver to simultaneously receive the dispatch call via the first outbound link and the second outbound link.

21. The MS of claim 20 wherein the MS does not have an inbound link to the first base site established for the dispatch call when the MS begins the soft handoff.

22. The MS of claim 20 wherein the MS further comprises a transmitter and wherein the processor is further for instructing the transmitter to transmit a request to establish an inbound link with the adjacent base site for the dispatch call.

* * * * *